US006826754B1

(12) United States Patent
Miller

(10) Patent No.: US 6,826,754 B1
(45) Date of Patent: Nov. 30, 2004

(54) METHOD FOR ELIMINATING OR REDUCING HANG CONDITIONS IN COMPUTER SYSTEMS

(75) Inventor: Douglas R. Miller, Hillsboro, OR (US)

(73) Assignee: International Business Machines Corporation, Armonk, NY (US)

(*) Notice: Subject to any disclaimer, the term of this patent is extended or adjusted under 35 U.S.C. 154(b) by 805 days.

(21) Appl. No.: 09/676,520

(22) Filed: Sep. 29, 2000

(51) Int. Cl.[7] ............................. G06F 9/46; G06F 12/00
(52) U.S. Cl. ....................... 718/104; 718/100; 718/102; 718/106; 710/200
(58) Field of Search ................................ 718/100, 102, 718/104, 106; 712/216–217, 220, 232; 710/200; 709/100, 102, 104, 106

(56) References Cited

U.S. PATENT DOCUMENTS

| | | | |
|---|---|---|---|
| 5,765,151 A | | 6/1998 | Senator |
| 5,822,512 A | | 10/1998 | Goodrum et al. |
| 5,864,653 A | | 1/1999 | Tavallaei et al. |
| 5,907,675 A | | 5/1999 | Aahlad |
| 5,940,827 A | | 8/1999 | Hapner et al. |
| 6,006,247 A | * | 12/1999 | Browning et al. ........... 718/102 |
| 6,021,262 A | | 2/2000 | Cote et al. |
| 6,223,204 B1 | * | 4/2001 | Tucker ....................... 710/200 |
| 6,243,788 B1 | * | 6/2001 | Franke et al. .................. 711/3 |
| 6,378,124 B1 | * | 4/2002 | Bates et al. .................. 717/129 |
| 6,546,443 B1 | * | 4/2003 | Kakivaya et al. ........... 710/200 |
| 6,636,950 B1 | * | 10/2003 | Mithal et al. ................ 711/147 |
| 6,662,364 B1 | * | 12/2003 | Burrows et al. ............. 718/102 |

OTHER PUBLICATIONS

IBM Technical Disclosure Bulletin: vol. 22, No. 7 pp. 2720–2721 (Dec. 1979).

* cited by examiner

Primary Examiner—Meng-Al T. An
Assistant Examiner—Syed Ali
(74) Attorney, Agent, or Firm—Law Offices of Michael Dryja; Abdy Raissinia

(57) ABSTRACT

An improved data structure handles locks and other mutual exclusion (mutex) mechanisms during a "panic" shutdown of the system such as when the system "hangs". Existing mutex data structures include an identifier of the engine/processor, the thread, or the processes acquiring the mutex. The improved mutex data structure further includes an indicator of whether the mutex was acquired before or after the panic (pre-panic or post-panic), preferably as a modification of the engineID after the panic is initiated such as by assigning the engines different engineIDs post-panic. The method checks mutexes to determine whether they were acquired pre- or post-panic mutexes. During a panic, alternative mutex handling routines free (release) pre-panic mutexes and shoot down the processors owning these mutexes. The data structure and method are generally useful in state transitions of the system, its engines/processors, and its processes and threads. An article of manufacture embodies the method and data structure in software.

25 Claims, 8 Drawing Sheets

METHOD FOR ELIMINATING OR REDUCING HANG CONDITIONS IN COMPUTER SYSTEMS

BACKGROUND OF THE INVENTION

1. Technical Field

This invention relates to a method for eliminating or reducing hangs during a shutdown or a panic of computer systems and improves the validity of debugging data acquired from the panic shutdown.

2. Description of the Prior Art

Arguably the most important part of a computer system is the data stored on it. This data is almost exclusively stored on offline storage devices such as disks. It seems to be a continuing trend that the speed of computers remains ahead of the speed of offline storage, and for these reasons most implementations of computer systems use a caching mechanism to keep frequently/recently accessed data in memory rather than on disk. There is a risk with this caching, namely that if anything prevents the cached data from being written to offline storage, the data will be lost. As an example, a sudden loss of power can result in cached data being lost. Another source of cache loss is a failure of the operating system (OS) that results in sudden shutdown without flushing (writing to offline storage) of the caches.

Symmetric Multi-Processor (SMP) computer systems use mutual exclusion (mutex) mechanisms to coordinate (prevent collision) of the activities being performed by the various processors (threads of execution). The integrity of these mutexes must be maintained, or severe problems will result including data corruption. Additionally, to prevent problems such as deadlock (system hangs) or system slowdown, it must be ensured that threads which acquire mutexes, do so for a minimal time and according to well-defined rules set forth by the designers of the code. During normal system operation, once the code design has been completed and the implementation sufficiently debugged, these mutexes tend to operate quite well. However, there are some cases where the operation of these mutexes can be disrupted, most notably during system shutdown but also as a result of "bugs" (in both hardware and software), and in general instances of system failure. Typically, the most reliable mechanism for recovering from these disruptions, is to shutdown the system and restart it from scratch.

Panic is a special case of OS shutdown. During a normal, orderly shutdown, the OS has the luxury of gracefully terminating applications and subsystems, including database systems and file systems, which results in complete data preservation (i.e. zero data loss or corruption). By definition, a panic is the expedited shutdown of the OS and system after detecting a failure of hardware or software. This creates a hostile environment in which the panic shutdown must operate. There are two main goals of a panic:

1. Minimize corruption and data loss, mainly by synchronization of in-memory (cached) data with off-line storage (disks).
2. Accurately preserve the state of the software and hardware in order to facilitate diagnosis of the root cause of the problem.

Note that these two goals may be in conflict under certain circumstances, for example, if a panic is the result of a failure in the disk subsystem. In fact, some circumstances may make it impossible to accomplish either, or both, of these goals.

Another intent of a panic is to restart the system with the hope that a fresh start will allow the system to run more successfully. To this end, the time taken by the panic shutdown, core dump, and reboot is critical to the availability of the system and must be minimized. With the unpredictable nature of the system during a panic, there are many impediments to completing the shutdown that may be encountered. One significant impediment is due to the fact that applications have not terminated (gracefully) and thus have not released the mutexes that they may have been holding. The panic shutdown must resolve these mutexes without adding to data corruption, more specifically it must ensure that "dead" mutexes are broken promptly while mutexes held by legitimately running threads are not "stolen".

Aahlad, U.S. Pat. No. 5,907,675, provides a method for managing deactivation and shutdown of a server. The patent teaches a method for a server to gently exit without actually terminating the server's clients. There is a lock-up flag that is used to prevent any new clients from joining. The invention implements an orderly and predictable server deactivation and/or shutdown. The invention utilizes an "usher" that continuously maintains a transaction counter indicative of the number of clients that are actively utilizing services.

Hapner, U.S. Pat. No. 5,940,827, provides a method for using mutexes to protect the shutdown time commit phase of a database and the shared database cache. The system informs the shutdown thread that the time commit thread is going away. The mutex is created to correspond to a piece of code.

However, while Aahlad and Hapner disclose shutting down an application, the present invention relates to shutting down the operating system that supports these applications. The difference between the prior art and the present invention is analogous to turning off one's television set verses shutting off the power for the whole house.

Therefore, there remains an unmet need for expediting panic shutdowns by eliminating or reducing hangs while minimizing data corruption/loss and processing system state information.

SUMMARY OF THE INVENTION

One aspect of this invention is an improved mechanism for dealing with mutual exclusion (mutex) structures in a computer system which can have at least one possible state transition. The mechanism includes an identifier, an indicator, and a mutex handler. The identifier identifies the owner of the mutex, which is preferably a processor or process. The indicator shows whether the mutex was acquired before or after the state transition. Where the state transition is from normal operation of the computer system to a "panic" shutdown, the indicator shows whether the mutex was acquired pre- or post- panic. The mutex handler is responsive to the identifier and the indicator, and in the preferred embodiment includes first routines for use before the state transition, and second routines for use after the state transition.

Another aspect of the invention is a method for handling a mutex after a state transition in the computer system. The method determines whether the mutex was acquired before or after the state transition, and handles the mutex differently depending upon whether the mutex was acquired before or after the state transition. In a preferred embodiment, the mutex determines from a data structure whether the mutex was acquired before or after the state transition.

Yet another aspect of the invention is an article of manufacture comprising a computer-readable signal bearing medium such as a recordable data storage medium or a modulated carrier signal. Means in the medium determine whether the mutex was acquired before or after a straight transition in the computer system, and handle the mutex differently depending upon whether the mutex was acquired before or after the state transition.

The invention thus adapts to panic shutdowns and other state transitions in a computer system, distinguishing between pre- and post-transition mutexes, and handling them differently so as to minimize corruption and data loss and accurately preserve a system state. Other features and advantages of this invention will become apparent from the following detailed description of the presently preferred embodiment, taken in conjunction with the accompanying drawings.

DESCRIPTION OF THE PREFERRED EMBODIMENT

Technical Background

In general, all objects within an OS (or any other software) need a unique identifier (ID), which can be used to refer to the object in an efficient manner. For example, objects stored in an array may use the array index as the ID. Other objects like threads and processes, use a generated ID that is assigned to the object at the time the object is created (or initialized for activity). Processor (engine) objects are also assigned an ID. Since processors (physically) and thread/processes (logically) are actually doing the work of the computer system, these objects/entities can be said to "own" various other objects or entities in the system. When these relationships are being tracked, the objects IDs are used as "owner IDs".

The present invention includes in the mutex data structure an indicator of whether the mutex was acquired pre-panic or post-panic, preferably by modifying the engineID after the panic is initiated, preferably by assigning the engines different engineIDs post-panic.

The present invention also is a method of using this pre-panic or post-panic indicator during the panic shutdown. The present invention checks the pre-/post-panic indicator (for example, the engine ID) of a mutex, and overrides, waits for, or otherwise handles the mutex differently if it is pre-panic than if it is post-panic.

Figure 1:
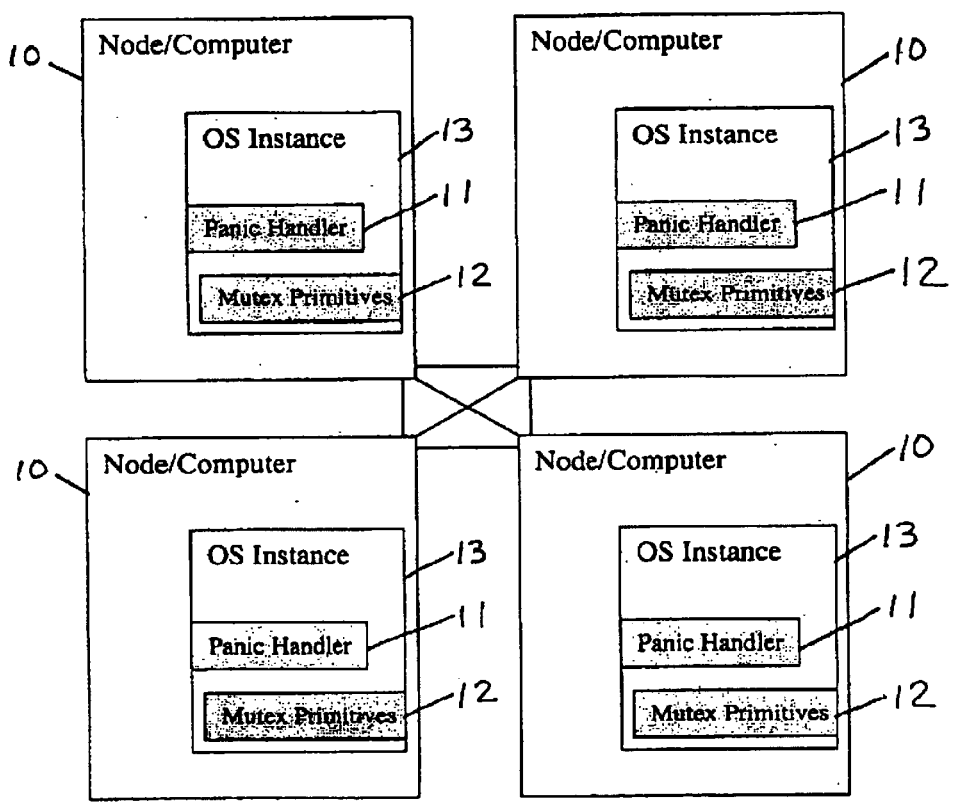
FIG. 1 is a block diagram of a 4-node server system according to the invention.

FIG. 1 shows a representation of a four node non-uniform memory access (NUMA) SMP system 10 with identical replicated OS instances 13. The present invention deals with the panic/shutdown handlers 11 and mutexing (mutual exclusion) primitives 12 of an SMP operating system (OS).

In this example, each processor is represented in the SMP OS 13 with one or more processor-private data structures. In addition, it is assumed that mutexes are implemented in one or more data structures. For the purpose of the present invention, these data structures are extended to include information about the state of the processor and mutex, specifically whether or not the system is in a panic/shutdown state.

Spin Mutex

Figure 2:
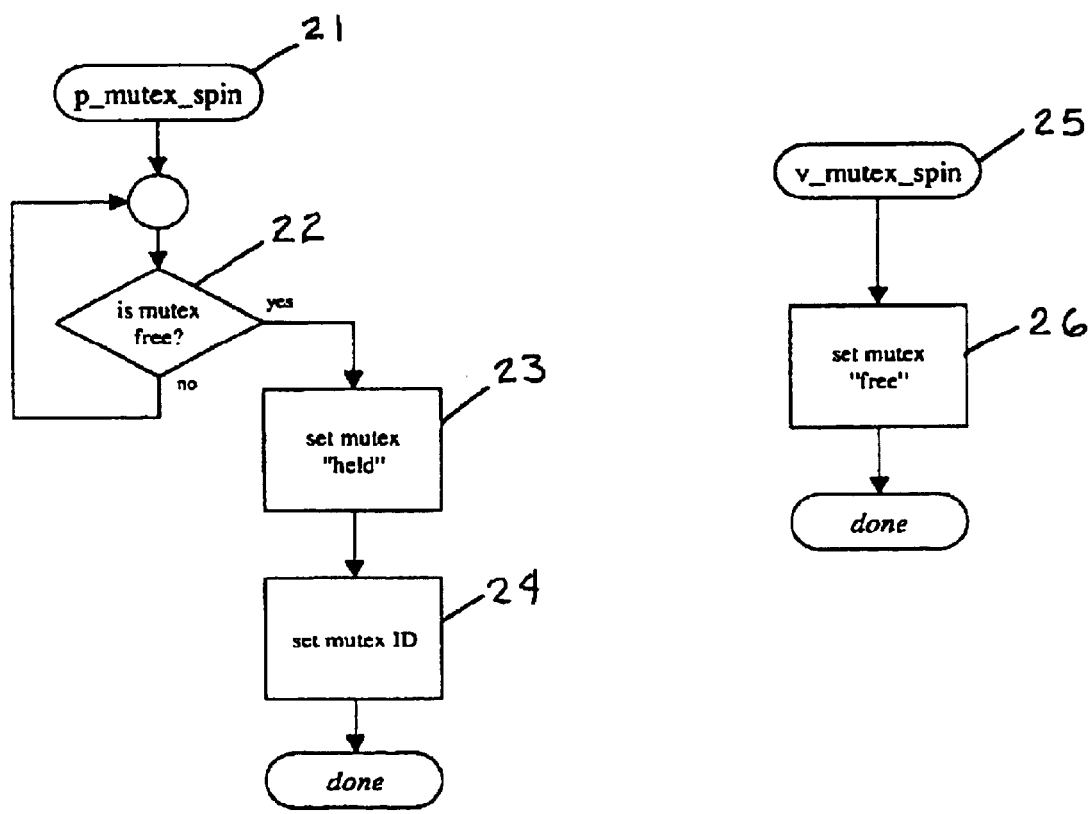
FIG. 2 is flow diagram of a spin mutex used in the system of FIG. 1.

FIG. 2 depicts a spin mutex: A spin mutex is a mutex whose wait mechanism involves simple looping without any throttling mechanism. A processor that is attempting to acquire a spin mutex that is held by another will consume the maximum amount of processor time spinning in a tight loop while repeatedly checking if the mutex is free.

Referring to FIG. 2, when attempting to acquire a spin mutex (p_mutex_spin) 21, a tight loop is enter whose only exit criteria is the mutex being free (available) 22. Once the exit criteria are met, the mutex is acquired (held) 23 and the identifier of the processor/thread/process (who acquired the mutex) is stored in the mutex data structure 24. When releasing a spin mutex (v_mutex_spin) 25, the mutex is simply set to a state of "free" (i.e. available) 26.

Sleep Mutex

Figure 3:
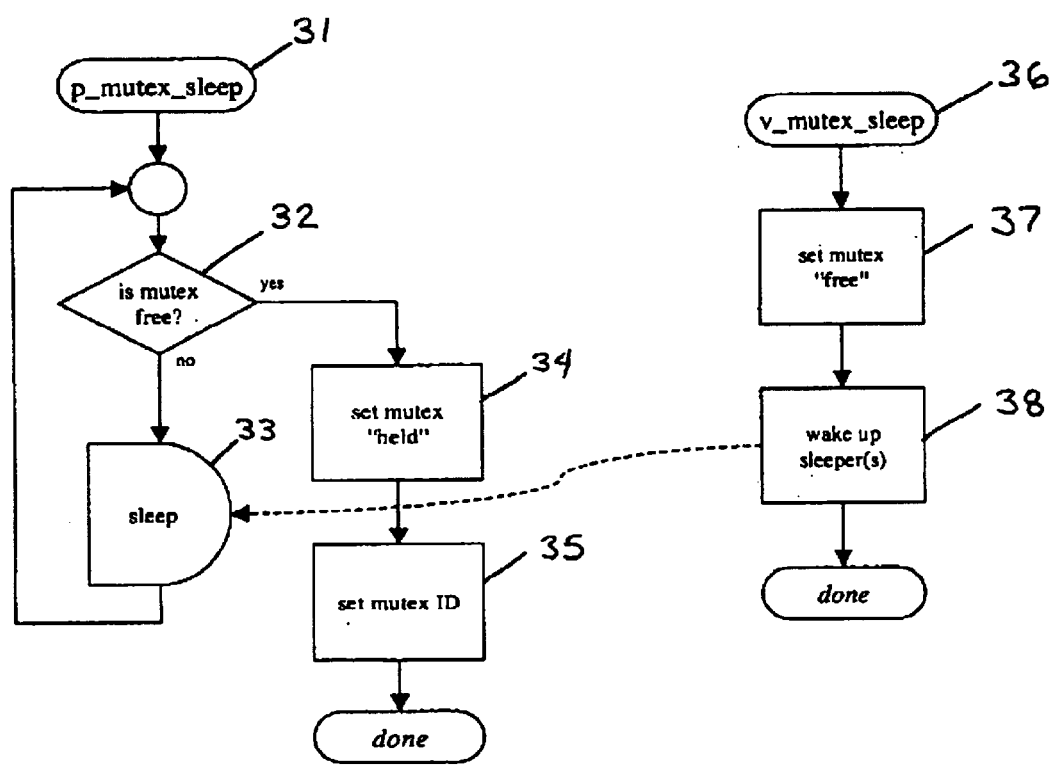
FIG. 3 is flow diagram of a sleep mutex.

FIG. 3 depicts a sleep mutex. An integral part of acquiring a sleep mutex is the sleeping, which generally implies a potential change of running processor. The pertinent information for the mutex is the processor ID of the processor that acquired the mutex, not the processor that might be running that thread at any given time. Therefore, the processor ID should be used as the mutex ID, set at the time that the mutex was acquired. The purpose of storing this information in the mutex is to provide a target for shoot-down in case this mutex is found to be held after the system enters the post-panic state. It is an implementation choice to either track the processor that acquired the mutex or the processor that last ran the thread holding the mutex. This choice drives whether to use the processor ID or the thread ID. Since the thread ID is always useful for debugging purposes, it may be practical to store both.

Figure 8A:
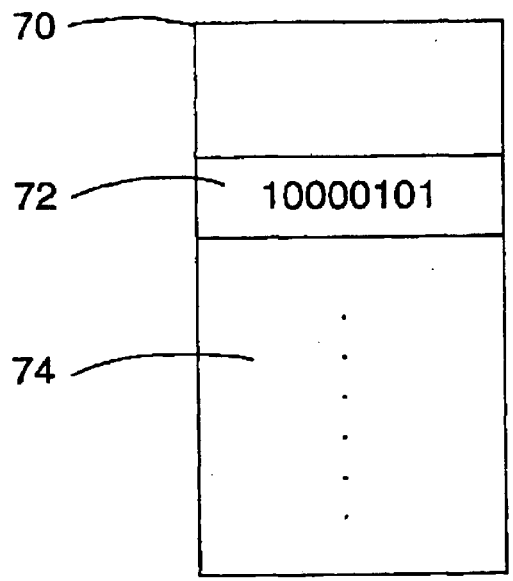
FIGS. 8A and 8B show the improved mutex data structure of the invention.

As shown in FIG. 8A, the processor ID is preferably an eight bit value corresponding to the number of the processor in the system. The processor ID is modified to create the owner ID 72 of the mutex data structure 70 by flipping the high order bit of the processor ID. Thus, processor number five would be assigned processor ID 00000101 (the binary value equal to the decimal number "five"), and the corresponding mutex owner ID 72 would be 10000101. The mutex data structure 70 also contains additional parameters 74 specific to the type of mutex represented, but those parameters are not pertinent to the invention and are not described further.

When attempting to acquire a sleep mutex (p_mutex_sleep) 31, a loop is enter whose only exit criteria is the mutex being free (available) 32. However, unlike the spin mutex, after each test of the mutex for availability, the thread is put to sleep 33. The only way to be awaked from this sleep is for another thread to release the mutex. This means that the processor running the p_mutex_sleep is capable of running some other thread while this thread waits for the mutex. Once the exit criteria are met, the mutex is acquired 34 and the processor ID identifying the processor/thread/process (who acquired the mutex) is modified 35 to create the mutex ID 72 which identifies the owner of the mutex, and is stored 35 in the mutex data structure 70. When releasing a sleep mutex (v_mutex_sleep) 36, the mutex is set to a state of "free" (i.e. available) 37 and any threads sleeping for this mutex are awakened (variations include waking all or only one of the sleepers) 38.

Various hybrids of spin and sleep mutexes are possible, such as spinning for a period of time and then sleeping. Some variations use a time-delay instead of sleep, or in addition to it.

Note that both FIGS. 2 and 3 depict only general actions. Typically, much if not all of the above will have to be done atomically. In addition, there may be changes made to interrupt priority levels, etc. How this is accomplished is platform dependent. Additionally, there may be sanity checking such as self-deadlock, hang (timeout), and stolen mutex detection. All of these are well known and well within the skills of one having ordinary skill in these arts.

Panic Handling of a Shutdown

Figure 4:
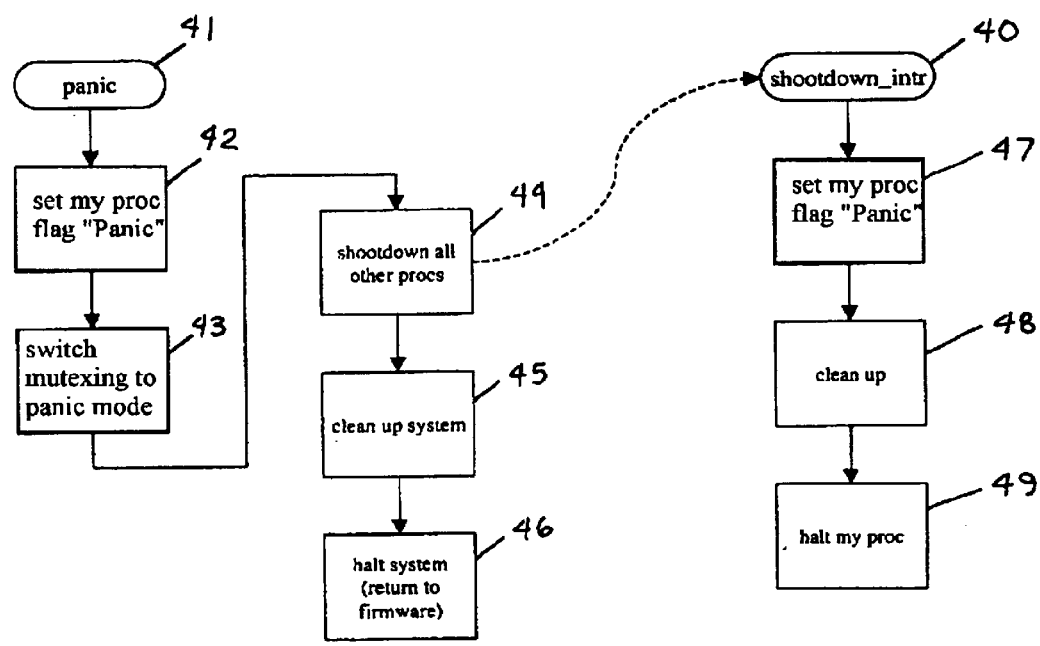
FIG. 4 is a flow diagram that depicts panic handling in the system of FIG. 1.

FIG. 4 shows the state transition of a general system shutdown implementing this invention, more specifically, a panic shutdown. Although both panic and "voluntary" shutdowns are handled similarly, with respect to mutexes, only the panic case is described for illustration purposes.

Once a panic is initiated 41, the panicking processor changes its flag to indicate that it is legitimately operating in the panic state 42, and changes the mutex routines used by the system to be the ones for panic 43. An additional task is the setting of some global system state or flag to indicate that the system is panicking.

Other standard panic activities might include shooting down all other processors 44, general clean up of the system 45 (possibly including flushing buffers and generating a core dump), and then returning to firmware control 46 which may initiate a reboot, or simply halt or power-off.

Mutex Handling, Normal vs. Panic

Figure 5:
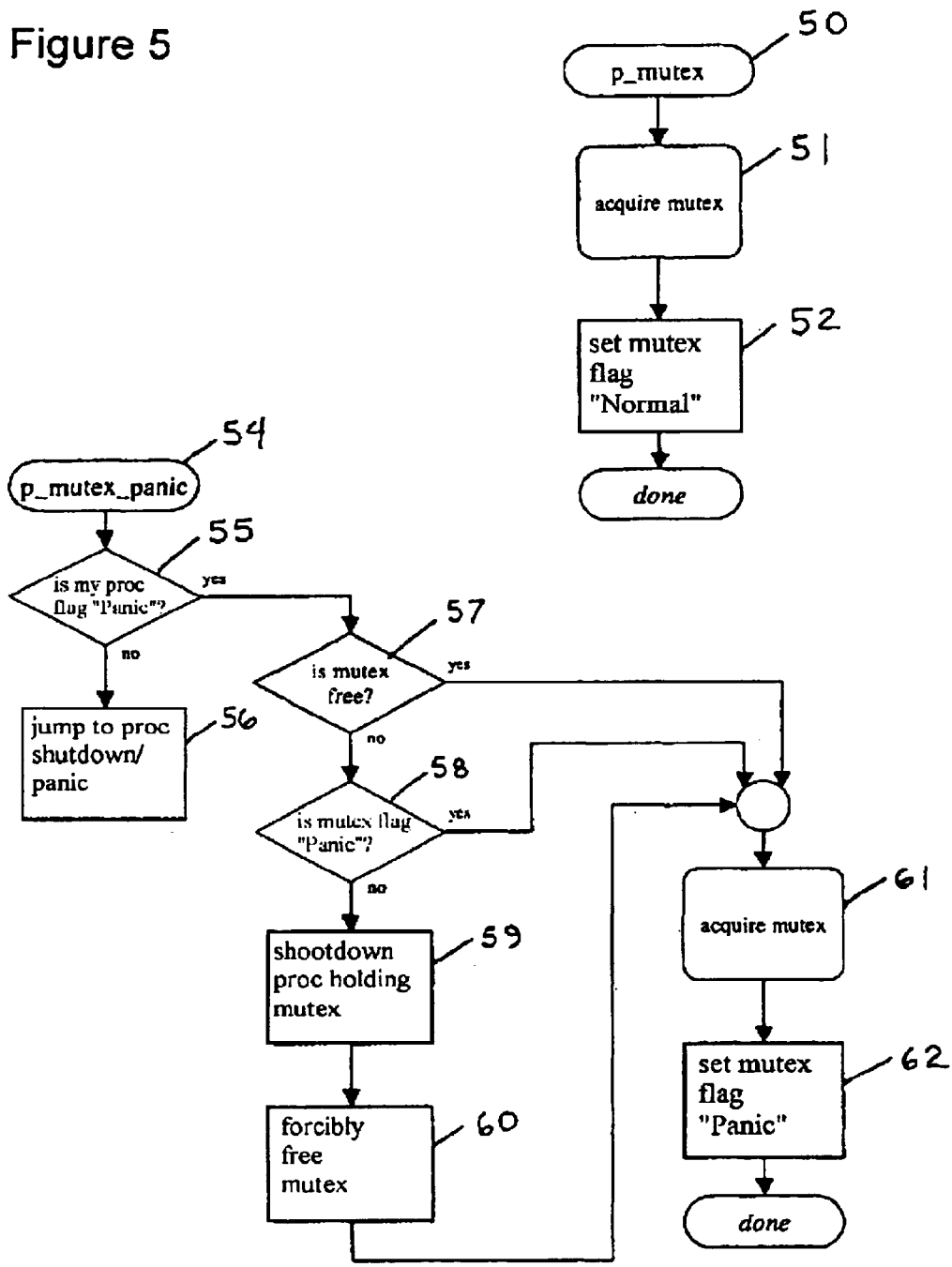
FIGS. 5 and 6 are flow diagrams that depict mutex handling in the system of FIG. 1.

FIG. 5 depicts mutex handling implementing this invention. During normal system operation, acquiring a mutex 51 consists of the normal process for that mutex, plus the setting of a mutex flag 52 to indicate the mutex was acquired while the system was in the "normal" state.

During a panic 54, acquiring a mutex consists of checking if the running processor has been transitioned to the panic state ("does the processor object have its panic flag set?") 55 and if not, then jumping directly to the processor shutdown code 56, and checking the mutex for having been acquired in the "Normal" system state 58 in which case the processor that holds the mutex is shot-down 59 (perhaps redundantly) and the mutex is forced to be free 60. Once a mutex is acquired 61, the mutex flag is set to indicate that it was acquired during the "Panic" system state 62. This indicator of a mutex's post-panic acquisition is accomplished by modifying the identifier of the owner of the mutex.

Figure 8B:
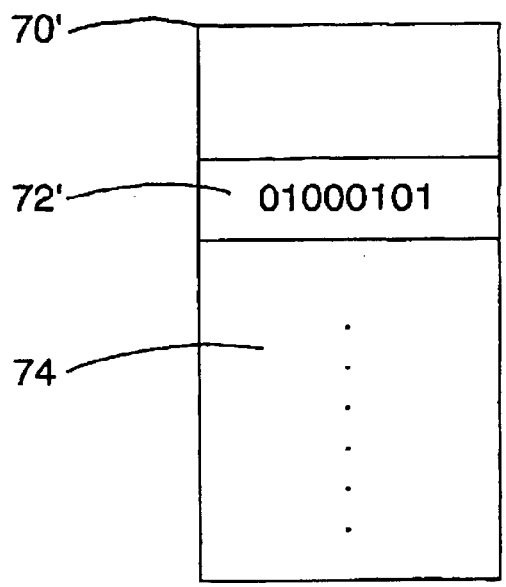

As seen in FIG. 8B, a post-panic mutex's mutex ID 72' is different than the identifier 72 of a pre-panic mutex, in that the two high-order bits of the pre-panic mutex ID 72 are flipped. Thus, a mutex owned by processor number 5 would be given a pre-panic mutex ID 72 equal to 10000101 as described above and shown in FIG. 8A, but would be give a post-panic mutex ID 72' equal to 01000101 as shown in FIG. 8B. The other parameters 74 of the post-panic mutex data structure 70' are not changed from their pre-panic values. Of course, one of ordinary skill will understand that various other ways exist to include a pre-/post-panic indicator in a mutex data structure, or in an external data structure referenced by the mutex handling routines.

Figure 6:
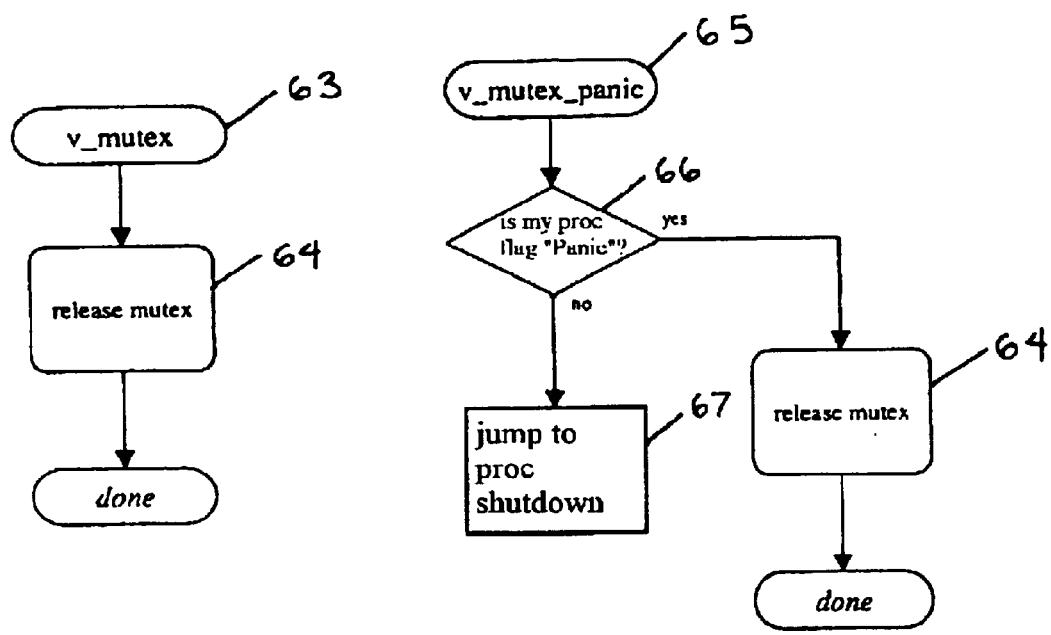

Referring now to FIG. 6 during normal system operation 63, releasing a mutex 64 consists of the normal process for that mutex. During a panic 65, releasing a mutex consists of checking the running processor has been transitioned to the panic state (does the processor object have its panic flag set?) and if not then jumping directly to the processor shutdown code 67, and the normal process 64 for that mutex. Note however, that while the mutex ID and flag could be cleared, their contents are not valid unless the mutex is held, and so clearing the mutex ID and flag would be unnecessary.

Computer Program Product

Figure 7:
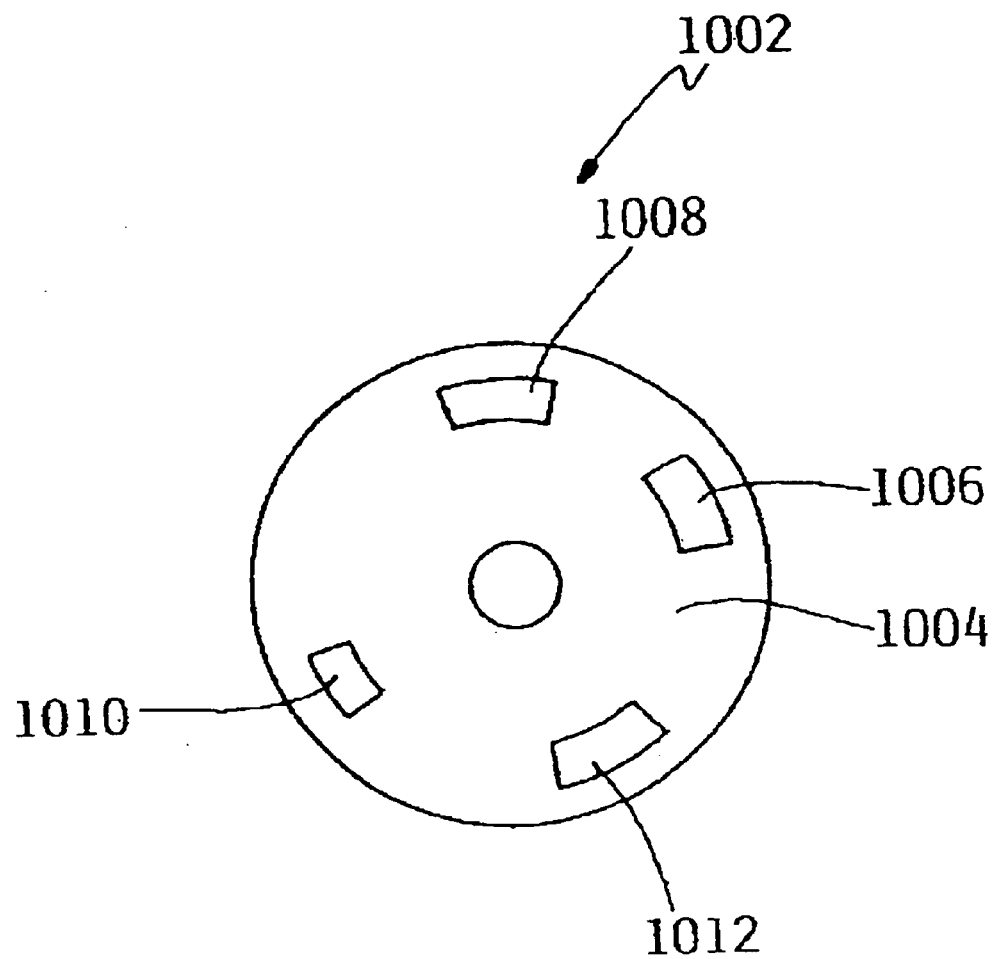
FIG. 7 shows a computer software program product embodying the invention.

FIG. 7 shows an article of manufacture or a computer program-product including a signal-bearing-media for storing thereon program means for carrying out the method and for embodying the data structure. While the present invention has been described above in the context of a data structure and methods of operation, the mechanisms of the present invention are capable of being distributed as a program-product in a variety of forms, and the present invention applies equally regardless of the particular type of signal-bearing-media used to actually carry out the distribution. Examples of signal-bearing-media include recordable media (such as magnetic floppy and hard disks, and CD-ROMs, biological data storage materials, and atomic structure data storage) and transmission media (such as digital and analog communications links, including fiber and wireless communications links).

An example of such an article of manufacture is illustrated in FIG. 7 as pre-recorded CD-ROM 1002. CD-ROM 1002 is intended for use with a data processing system, and includes optical storage medium 1004, and program means 1006, 1008, 1010, and 1012 recorded thereon. It will be understood that such apparatus and articles of manufacture all fall within the spirit and scope of this invention. Program means 1006, 1008 causes the operating system to create the improved data structure embodied in the mutex 12. Program means 1010, 1012 cause the OS 13 to perform the steps shown in the flow diagrams of FIGS. 2-6.

Advantages Over the Prior Art

This invention permits determination of the context that a mutex was acquired under (pre-panic vs. post-panic) which is not available in other mutex mechanisms. Other mechanisms that are used to resolve shutdown mutex problems, have been limited to timeouts, which have inherent problems including having to guess at how long is "too long" to wait for a mutex and how to measure such a time period in an efficient manner at such a low level, in addition to not providing any intelligence about whether the mutex was legitimately acquire post-panic.

Alternative Embodiments

It will be appreciated that, although specific embodiments of the invention have been described herein for purposes of illustration, various modifications may be made without departing from the spirit and scope of the invention. In particular, if a state transition invalidates the threads executing prior to the transition, then the mutexes must also be transitioned (invalidated). If the state transition is such that all threads are notified and voluntarily terminate, then there is no need for mutex handling. However, if the transition is forced (e.g. from normal operation to a panic; from single uses to multi-user mode; between run levels) then it is necessary to properly handle not only the mutexes but also any threads that failed to make the transition. The present invention can therefore be extended to include state transitions of not only processors and systems, but also threads and processes. Accordingly, the scope of protection of this invention is limited only by the following claims and their equivalents.

I claim:

1. A mechanism for a mutex in a computer system having at least one possible state transition, comprising:
   identifier of the owner of the mutex;
   an indicator of whether the mutex was acquired before or after the state transition; and
   a mutex handler responsive to the identifier and the indicator,
   wherein the state transition is selected from the group consisting of
      a state transition between operational states of the computer system;
      a state transition between operational states of a processor of the computer system;
      a state transition between states of a process executing in the computer system; and
      a state transition between states of a thread executing in the computer system.

2. The mechanism of claim 1, wherein the state transition is from normal operation to a panic.

3. The mechanism of claim 1, wherein the indicator and the identifier are combined and sized to be handled in a single atomic operation.

4. The mechanism of claim 1, wherein the indicator is a modification of the identifier.

5. The mechanism of claim 1, wherein the identifier identifies a processor.

6. The mechanism of claim 5, wherein the identifier is a processor ID value.

7. The mechanism of claim 1, wherein:
   the identifier is a first value if the mutex is acquired before the state transition; and
   the identifier is a second value if the mutex is acquired after the state transition.

8. The mechanism of claim 1, wherein the mutex handler includes: first mutex handling routines for use before the state transition; and second mutex handling routines for use after the state transition.

9. The mechanism of claim 1, wherein the mutex handler overrides the mutex if the mutex was acquired before the state transition, and handles the mutex normally if the mutex was acquired after the state transition.

10. A method for handling a mutex after a state transition in a computer system, comprising the steps of:
    determining whether the mutex was acquired before or after the state transition; and
    handling the mutex differently depending on whether the mutex was acquired before or after the state transition,
    wherein the state transition is selected from the group consisting of
       a state transition between operational states of the computer system;
       a state transition between operational states of a processor of the computer system;
       a state transition between states of a process executing in the computer system; and
       a state transition between states of a thread executing in the computer system.

11. The method of claim 10, wherein whether the mutex was acquired before or after the state transition is determined from a data structure of the mutex.

12. The method of claim 10 wherein the step of handling the mutex includes: overriding the mutex if the mutex was acquired before the state transition; and handling the mutex normally if the mutex was acquired after the state transition.

13. The method of claim 10, further including the step of voluntary termination by a thread, where the thread existed before the state transition, and where the thread accesses the mutex after the state transition.

14. The method of claim 10, further including the step of taking additional steps to terminate the owner of a mutex acquired before the state transition.

15. The method of claim 10, wherein the state transition is from a normal operational state of the computer system to a panic.

16. The method of claim 10, wherein the determining step is responsive to:
    an identifier of the owner of the mutex; and
    an indicator of whether the mutex was acquired before or after the state transition.

17. The method of claim 16, wherein the indicator is a modification of the identifier.

18. The method of claim 17, wherein:
    the identifier is a first value if the mutex is acquired before the state transition; and
    the identifier is a second value if the mutex is acquired after the state transition.

19. The method of claim 16, wherein the identifier is a processor ID value.

20. A computer program comprising computer program code means adapted to perform a method for handling a mutex after a state transition in a computer system when run on a computer, said method comprising the steps of:
    determining whether the mutex was acquired before or after the state transition; and
    handling the mutex differently depending on whether the mutex was acquired before or after the state transition,
    wherein the state transition is selected from the group consisting of:
       a state transition between operational states of the computer system;
       a state transition between operational states of a processor of the computer system;
       a state transition between states of a process executing in the computer system; and
       a state transition between states of a thread executing in the computer system.

21. An article for handling a mutex, comprising:
    a computer readable signal bearing medium; and
    means in the medium for performing the steps of:
       determining whether the mutex was acquired before or after the state transition; and
       handling the mutex differently depending on whether the mutex was acquired before or after the state transition,
       wherein the state transition is selected from the group consisting of:
          a state transition between operational states of the computer system;
          a state transition between operational states of a processor of the computer system;
          a state transition between states of a process executing in the computer system; and
          a state transition between states of a thread executing in the computer system.

22. An article for handling a mutex after a state transition in a computer system comprising:

a computer readable signal bearing medium;

means in the medium for determining whether the mutex was acquired before or after the state transition; and means in the medium for handling the mutex differently depending on whether the mutex was acquired before or after the state transition, wherein the state transition is selected from the group consisting of a state transition between operational states of the computer system;

a state transition between operational states of a processor of the computer system;

a state transition between states of a process executing in the computer system; and a state transition between states of a thread executing in the computer system.

23. The article of claim 22, wherein the medium is a recordable data storage medium selected from the group consisting of magnetic, optical, biological and atomic data storage media.

24. The article of claim 22, wherein the medium is a modulated carrier signal.

25. The article of claim 22, wherein the state transition is from a normal operational state of the computer system to a panic.

* * * * *